United States Patent
Lee et al.

(10) Patent No.: US 11,074,814 B2
(45) Date of Patent: Jul. 27, 2021

(54) PORTABLE APPARATUS FOR PROVIDING NOTIFICATION

(71) Applicant: LG ELECTRONICS INC., Seoul (KR)

(72) Inventors: Yongsuk Lee, Seoul (KR); Taeyoung Lee, Seoul (KR); Yoonkyum Kim, Seoul (KR); Jongjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/795,462

(22) Filed: Feb. 19, 2020

(65) Prior Publication Data

US 2021/0192950 A1 Jun. 24, 2021

(51) Int. Cl.
| | |
|---|---|
| G08G 1/123 | (2006.01) |
| H04W 68/04 | (2009.01) |
| H04W 4/40 | (2018.01) |
| H04W 4/02 | (2018.01) |
| H04W 68/00 | (2009.01) |
| G06Q 50/30 | (2012.01) |

(52) U.S. Cl.
CPC .............. *G08G 1/123* (2013.01); *G06Q 50/30* (2013.01); *H04W 4/026* (2013.01); *H04W 4/40* (2018.02); *H04W 68/005* (2013.01); *H04W 68/04* (2013.01)

(58) Field of Classification Search
CPC ........ G08G 1/123; H04W 4/40; H04W 4/026; H04W 4/04; G01C 21/10
See application file for complete search history.

(56) References Cited

U.S. PATENT DOCUMENTS

| | | | | |
|---|---|---|---|---|
| 2003/0137435 | A1* | 7/2003 | Haddad ................. | G08G 1/133 340/994 |
| 2007/0208502 | A1* | 9/2007 | Sakamoto ............. | G01C 21/20 701/19 |
| 2011/0153495 | A1* | 6/2011 | Dixon .................... | G06Q 20/10 705/39 |
| 2012/0092194 | A1* | 4/2012 | Crucs .................... | G08G 1/123 340/994 |
| 2014/0125502 | A1* | 5/2014 | Wittkop ................ | G08G 1/127 340/989 |
| 2014/0203951 | A1* | 7/2014 | Moon .................... | G08G 1/123 340/901 |
| 2014/0257867 | A1* | 9/2014 | Gay ....................... | G06Q 40/08 705/4 |
| 2014/0296656 | A1* | 10/2014 | Kasama ................ | H04W 4/029 600/301 |
| 2015/0070131 | A1* | 3/2015 | Beaurepaire .......... | G01C 21/10 340/5.8 |
| 2019/0079519 | A1* | 3/2019 | Hwang ................. | G05D 1/0212 |
| 2019/0143917 | A1* | 5/2019 | Lee ......................... | B60R 16/03 307/10.1 |
| 2019/0236322 | A1* | 8/2019 | Arquero ................ | B61D 41/00 |

\* cited by examiner

*Primary Examiner* — Hoi C Lau
(74) *Attorney, Agent, or Firm* — Lee Hong Degerman Kang & Waimey

(57) ABSTRACT

The present disclosure discloses a portable apparatus which communicates with a vehicle through a wireless network, obtains vehicle information as the wireless network is connected, determines whether a user boards the vehicle based on motion state data of the user and the vehicle information, determines a stop to provide notification based on whether the user boards the vehicle and a getting-off history, and outputs getting-off notification.

14 Claims, 11 Drawing Sheets

PORTABLE APPARATUS FOR PROVIDING NOTIFICATION

CROSS-REFERENCE TO RELATED APPLICATIONS

Pursuant to 35 U.S.C. § 119(a), this application claims the benefit of earlier filing date and right of priority to Korean Patent Application No. 10-2019-0169615 filed on Dec. 18, 2019, the contents of which are all hereby incorporated by reference herein in its entirety.

BACKGROUND

The present disclosure relates to a notification providing apparatus for determining a vehicle to be boarded by a user, predicting a stop to get off when it is determined that the user boards the vehicle, and providing notification, and a method thereof.

As transportation means of modern people, there are vehicles such as buses, subways, taxis, and the like, in detail. Among them, buses and subways are inexpensive and efficient traffic means. Meanwhile, unlike the subway that moves along a predetermined route underground and provides clear notification for each stop, in a bus, there is a case where the user may not notice the clear notification as the bus moves on the ground and the routes thereof are similar to each other and types thereof are diversified.

Previously, there has been a simple method of providing a notification in which a bus to be boarded and a stop to get off are preset to a terminal used by a user, and a notification is provided when the user's location reaches the stop to get off.

SUMMARY

An object of the present disclosure is to obtain a getting off stop information of a vehicle frequently used by a user to provide getting off notification to the user without repeated setting.

The present disclosure provides a portable apparatus that obtains vehicle information as the wireless network is connected, determines whether the user boards the vehicle based on motion state data and vehicle information of the user, and determines a stop to provide notification based on whether the user boards the vehicle and a getting off history.

DETAILED DESCRIPTION OF THE EMBODIMENTS

Figure 1:
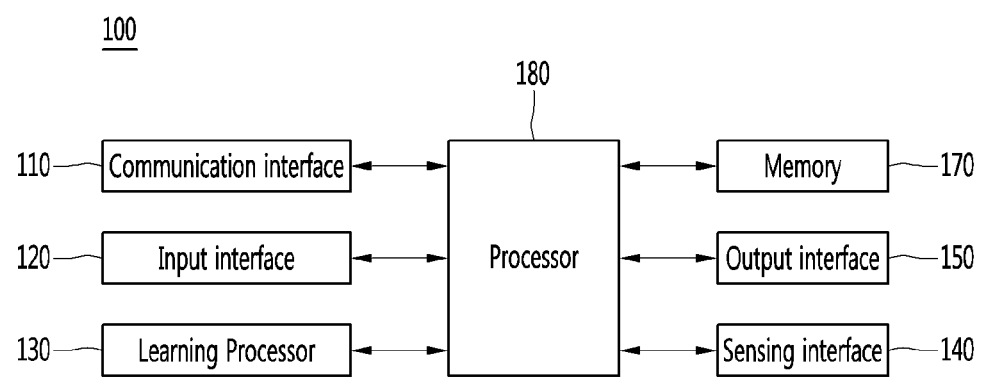
FIG. 1 is a block diagram illustrating an AI apparatus according to an embodiment of the present disclosure.

Hereinafter, details of the present invention will be described.

An embodiment described below is only an example of the present invention, and the present invention can be deformed in various modes. Hence, specific configurations and functions disclosed below by no means limit the claims.

Hereinafter, embodiments of the present disclosure are described. In detail with reference to accompanying drawings and regardless of the drawings, symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving interface may include an actuator or a motor and may perform various physical operations such as moving a robot joint. In addition, a movable robot may include a wheel, a brake, a propeller, and the like in a driving interface, and may travel on the ground through the driving interface or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensing interface 140, an output interface 150, a memory 170, and a processor 180.

The communication interface 110 may transmit and receive data to and from external devices such as other 100*a* to 100*e* and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may obtain various kinds of data.

Here, the input interface 120 may include a camera for inputting a video signal, a microphone for receiving an audio signal, and a user input interface for receiving information from a user. The camera or the microphone may be treated as a sensor, and the signal obtained from the camera or the microphone may be referred to as sensing data or sensor information.

The input interface 120 may obtain a training data for model learning and an input data to be used when an output is obtained by using learning model. The input interface 120 may obtain raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing interface 140 may obtain at least one of internal information about the AI apparatus 100, ambient environment information about the AI apparatus 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display interface for outputting time information, a speaker for outputting auditory information, and a haptic module for outputting haptic information.

The memory 170 may store data that supports various functions of the AI apparatus 100. For example, the memory 170 may store input data obtained by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may obtain intention information for the user input and may determine the user's requirements based on the obtained intention information.

The processor 180 may obtain the intention information corresponding to the user input by using at least one of a speech to text (STT) engine for converting speech input into a text string or a natural language processing (NLP) engine for obtaining intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
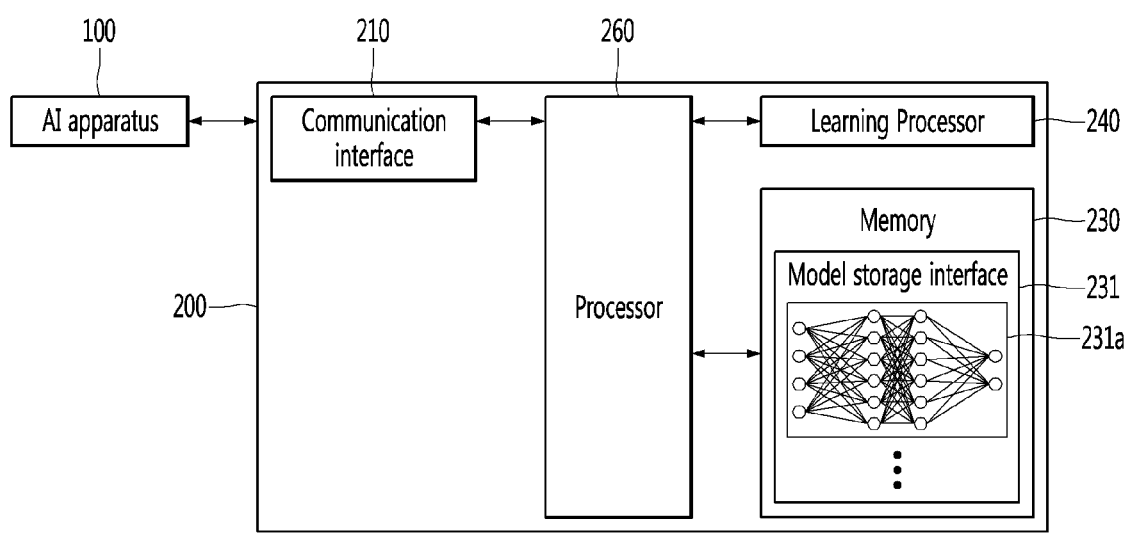
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage interface 231. The model storage interface 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
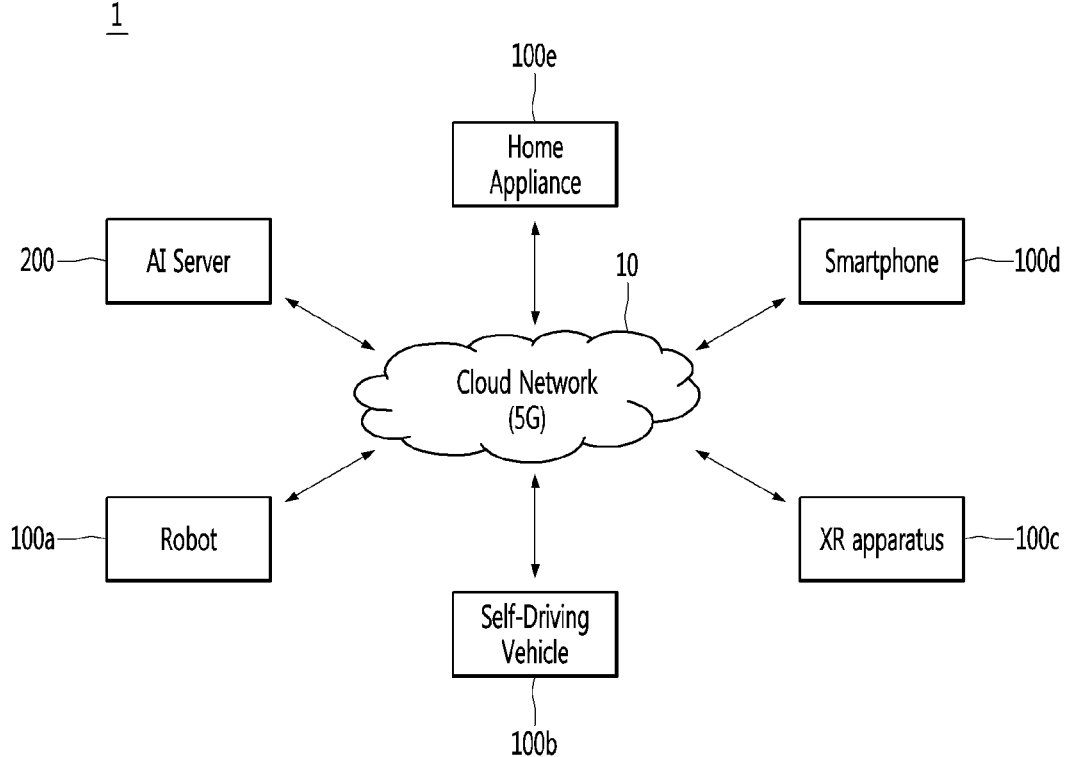
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may obtain state information about the robot 100a by using sensor information obtained from various kinds of sensors, may detect (recognize) surrounding environment and objects, may generate map data, may determine the route and the travel plan, may determine the response to user interaction, or may determine the operation.

The robot 100a may use the sensor information obtained from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information obtained from the external device to determine the travel route and the travel plan, and may control the driving interface such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving interface based on the control/interaction of the user. Here, the robot 100a may obtain the intention information of the interaction due to the user's operation or speech utterance, and may determine the response based on the obtained intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may obtain state information about the self-driving vehicle 100b by using sensor information obtained from various kinds of sensors, may detect (recognize) surrounding environment and objects, may generate map data, may determine the route and the travel plan, or may determine the operation.

Like the robot 100a, the self-driving vehicle 100b may use the sensor information obtained from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information obtained from the external device to determine the travel route and the travel plan, and may control the driving interface such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving interface based on the control/interaction of the user. Here, the self-driving vehicle 100b may obtain the intention information of the interaction due to the user's operation or speech utterance, and may determine the response based on the obtained intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data obtained from various sensors or the external devices, generate position data and attribute data for the three-dimensional points, obtain information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by obtaining sensor information on behalf of the self-driving vehicle 100b and providing the sensor information to the self-driving vehicle 100b, or by obtaining sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving interface of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may obtain the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may obtain the sensor information from the sensors including the camera and output the generated XR image based on the obtained sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may obtain the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
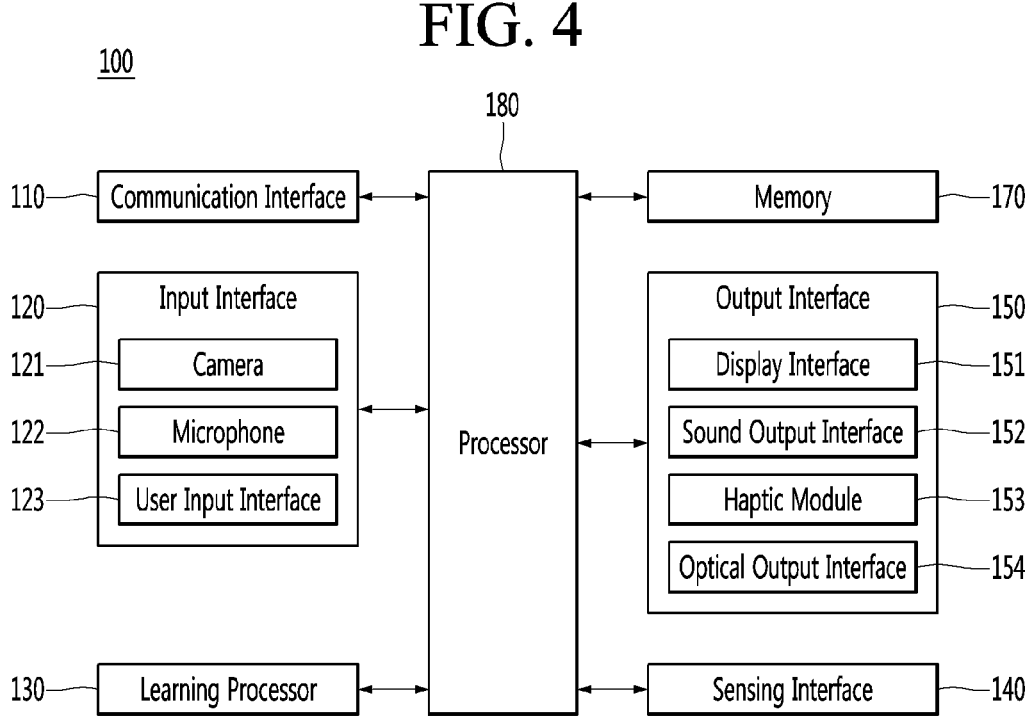
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

In the present disclosure, the AI apparatus 100 may include an edge device.

The communication interface 110 may also be referred to as a communicator.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display interface 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing interface 140 may also be referred to as a sensor interface.

The output interface 150 may include at least one of a display interface 151, a sound output module 152, a haptic module 153, or an optical output module 154.

The display interface 151 may display (output) information processed in the AI apparatus 100. For example, the display interface 151 may display execution screen information of an application program running on the AI apparatus 100 or user interface (UI) and graphic user interface (GUI) information according to such execution screen information.

The display interface 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Hereinafter, in the present disclosure, the artificial intelligence apparatus 100 may be used interchangeably with a portable apparatus.

According to the present disclosure, the communication interface of the portable apparatus may communicate with a vehicle through a wireless network. In addition, the processor 180 of the portable apparatus 100 may obtain vehicle information as the wireless network is connected, determine whether the user boards the vehicle based on motion state data of the user and the vehicle information, and determines a stop to provide notification based on whether the user boards the vehicle and a getting off history. In addition, the output interface 150 of the portable apparatus may output the getting off notification. Hereinafter, the operation sequence of the present disclosure will be described in detail.

Figure 5:
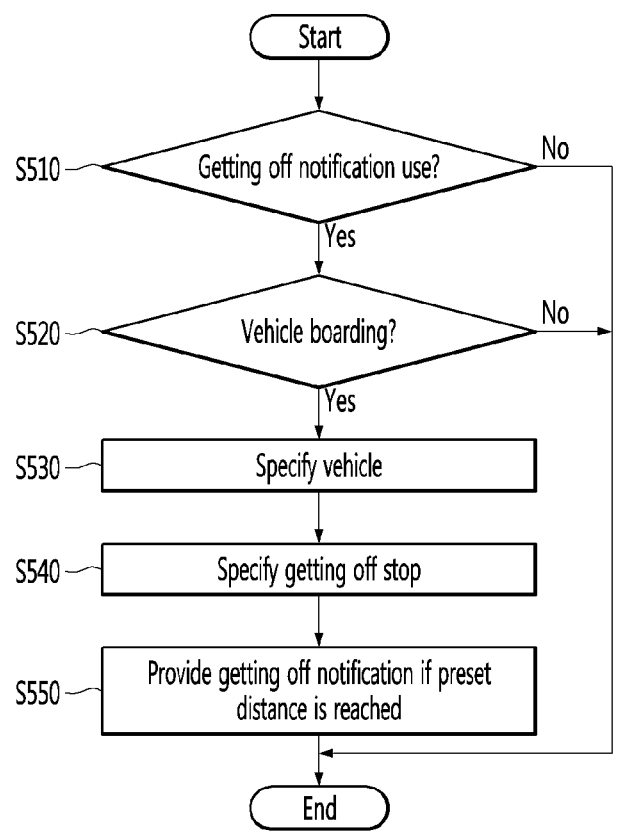
FIG. 5 is a flowchart of the present disclosure.

FIG. 5 is a flowchart of the present disclosure.

FIG. 5 is a flowchart illustrating an operation when the getting off notification function is used in the portable apparatus 100 used by a user.

According to the present disclosure, the user may control the portable apparatus 100 to approve the use of the getting off notification function (S510). In this case, the user may input to approve the getting off notification function through the input interface 120 of the portable apparatus 180. The input interface 120 of the portable apparatus 100 receives a user's input, and the processor 180 may operate the getting off notification function according to the user's approval of using the getting off notification.

According to the present disclosure, when the getting off notification function is operated, the processor 180 of the portable apparatus 100 may determine whether the user boards the vehicle (S520). If the processor 180 determines that the user boards the vehicle, the processor 180 may specify which vehicle the vehicle is (S530). If it is specified which vehicle the vehicle is, the processor 180 may analyze the getting off (or stop) history that the user got off the previously specified vehicle to specify the getting off stop (S540). Based on the above process, the processor 180 may predict the stop at which the user will get off, and if the predetermined distance is reached from the predicted stop, the output interface 150 of the portable apparatus 100 may provide a get off notification (S550).

Figure 6:
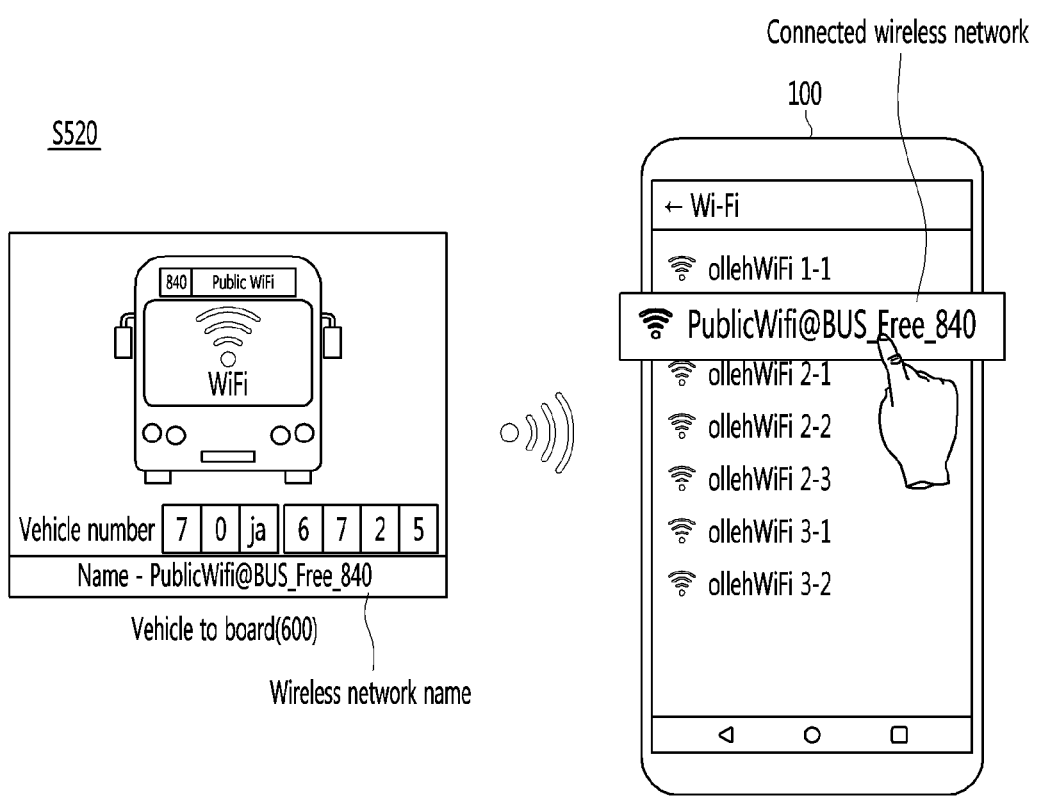
FIG. 6 is an example of determining vehicle boarding of the present disclosure.

FIG. 6 is an example of illustrating vehicle boarding determination of the disclosure.

In detail, FIG. 6 illustrates a process in which the processor 180 obtains whether a user boards a vehicle and boarding vehicle information.

<Obtaining of Vehicle Information>

Referring to FIG. 6, the communication interface 110 of the portable apparatus 100 may communicate with a vehicle through a wireless network. In this case, the communication interface 110 of the portable apparatus 100 may obtain vehicle information as the wireless network is connected. In addition, the vehicle information may include a boarding vehicle number obtained from a name of the wireless network. The vehicle information may include various information for identifying the boarding vehicle provided from the wireless network.

In this case, the wireless network may be provided by a vehicle or a communication interface (not illustrated) of the vehicle. In this case, the communication technology provided by the vehicle may include Global System for Mobile communication (GSM), Code Division Multi-Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, Near Field Communication (NFC), and the like.

For example, the communication interface 110 of the portable apparatus 100 may communicate with a bus having number 840 through Wi-Fi, which is a wireless network provided by the bus having number 840 (70JA6725). In this case, the communication interface 110 of the portable apparatus 100 may obtain vehicle information as the communication interface 110 of the portable apparatus 100 is connected to Wi-Fi of the bus having number 840.

In addition, the vehicle information may be '840' which is a bus number included in the Wi-Fi name (PublicWiFi-BUS Free 840) of the bus having number 840.

The portable apparatus 100 according to the present disclosure may communicate with a network provided by the bus having number 840 and obtain '840' which is vehicle information of the bus having number 840.

<Determination of Whether to Board Vehicle>

If the portable apparatus 100 according to the present disclosure obtains vehicle information as the wireless network is connected, then the portable apparatus 100 according to the present disclosure may determine whether a user boards a vehicle.

In detail, the processor 180 of the portable apparatus 100 may determine whether the user boards the vehicle based on the motion state data of the user and the vehicle information.

In this case, the motion state data may include information to determine what kind of activity is performed by grasping the motion state. In detail, the motion state data may include motion information of a user obtained from a motion classifier (not illustrated).

The motion classifier may classify motion data received from the sensing interface 140 of the portable apparatus 100 into the motion state data. The motion state data may be information indicating which of the plurality of motion states well describes a user's motion.

For example, the motion states indicated by the motion state data may include a number of coarse motion states, such as a stationary motion state, a moving motion state, and a violent motion state. In addition, the motion classifier may further classify the moving motion state into a pedestrian motion state or a vehicle motion state, and further classify the pedestrian motion state into a walking motion state or a running motion state.

For example, the motion classifier may classify the user's motion states (for example, walking, running, stopping, manipulating, transporting) for each second from 20 Hz, and three-axis acceleration samples. The CMC can then detect changes in motion states (for example, from walking to stationary states) that are common of low rate (for example, 100/day).

In addition, the motion classifier may use the motion data received from the sensing interface 140 to detect a change in the motion state. For example, the motion state data generated by the motion classifier may indicate whether the motion state is changed from one of the fixed motion state, the moving motion state, and the vehicle boarding motion state to another.

In addition, the motion classifier may also be a motion classifier (Coarse Motion Classifier; CMC) engine. In another aspect, the motion classifier may be a processor 180 of any other suitable engine, circuit, or portable apparatus.

The processor 180 according to the present disclosure may store the motion state data obtained from the motion classifier to the memory 170 of the portable apparatus 100.

The processor 180 of the portable apparatus 100 may obtain motion state data of the user from the motion classifier. For example, the processor 180 may obtain the pedestrian motion state as the motion state data when the user walks toward the stop to board the bus. In addition, when a user boards a bus, the processor 180 may obtain a vehicle boarding state as motion state data.

According to the present disclosure, the processor 180 of the portable apparatus 100 may determine that the user boards the vehicle having the boarding vehicle number when the connection with the wireless network continues for a predetermined time or more while the motion state data is the vehicle boarding state.

In detail, the processor 180 may determines that the user boards the vehicle providing a wireless network when the user's motion state data is changed from the pedestrian motion state or the stationary motion state to the vehicle boarding state and maintained, and when the vehicle information obtained from the wireless network is continued for a predetermined time or more in the same state.

For example, suppose that a user wants to board the bus having number 840, the processor 180 included in the user's portable apparatus may obtain information that the user is in a stationary motion state through a motion classifier. When the bus having number 840 reaches the stop, the communication interface 110 of the portable apparatus 100 may communicate with a wireless network provided by the bus having number 840.

The processor 180 may obtain '840', which is vehicle information of bus having number 840, from a name of the connected wireless network.

When the user boards the bus having number 840, the processor 180 of the portable apparatus 100 may obtain motion state data indicating that the user is in a vehicle boarding state through the motion classifier. In addition, the processor 180 may determine whether the vehicle information obtained from the communication interface 110 lasts for a predetermined time or more in the same state as '840'.

The processor 180 may determine that the user boarded the bus having number 840 when the motion state data is a vehicle boarding state and the vehicle information is the same as '840' for a predetermined time or more. Through the above process, it is possible to determine whether the user boards a vehicle that provides a wireless network of the numerous vehicles that stop at the bus stop, and determine whether the user boards the vehicle in which the user wants to board by determining whether the vehicle information remains the same for a predetermined time or more even if it temporarily communicates with a vehicle in which the user does not board.

When the portable apparatus 100 according to the present disclosure determines that the user boards a vehicle to which a wireless network is connected, the portable apparatus 100 may determine whether the user boards which vehicle of a plurality of vehicles having the same vehicle information. A description with reference to FIG. 7 is as follows.

Figure 7:
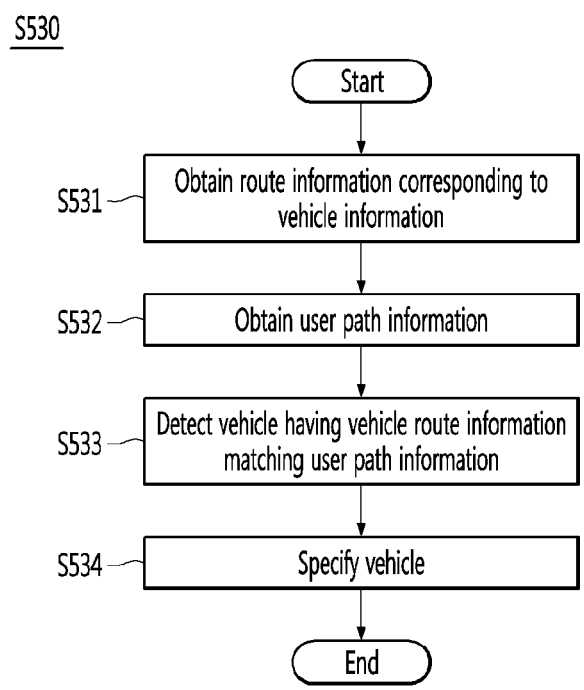
FIG. 7 is a flowchart of the present disclosure.

FIG. 7 is a flowchart of the present disclosure.

Specifically, FIG. 7 is a flowchart for specifying a boarding vehicle of a plurality of vehicles having the same vehicle information of the present disclosure.

The vehicle information described in FIG. 6 may include a boarding vehicle number obtained from the name of the wireless network. In addition, the vehicle information may include various information for identifying the boarding vehicle provided from the wireless network. Meanwhile, when the boarding vehicle number obtained from the name of the wireless network is used as vehicle information, vehicles having the same number may exist in each region, and thus, it is necessary to distinguish the vehicle of a plurality of vehicles having the same number in which the user boards.

For example, the bus having a number of 840 may exist in various regions or cities, such as Seoul, Gyeonggi, Gyeongnam, and the like. In addition, there may be buses having a number of 840 with different routes even in one region. Therefore, even if the portable apparatus obtains '840' as the vehicle information, the process of FIG. 7 may be performed to determine which bus of the plurality of buses having a number of 840 is the bus having a number of '840' in which a user actually boards.

When the processor 180 of the portable apparatus 100 according to the present disclosure determines that the user boards a vehicle that provides vehicle information, the processor 180 may obtain route information of a plurality of vehicles having the boarding vehicle number using the boarding vehicle number (S531). In this case, the plurality of vehicle route information may include information provided from the vehicle information server 200 communicating with the communication interface 110 of the portable apparatus 100.

The processor 180 of the portable apparatus 100 may obtain movement path information of the user using location information received through the communication interface 110 (S532).

In detail, the communication interface 110 may receive the ground location information of the user obtained using a GPS, and the processor 180 may generate the movement path information of the user using the location information received from the communication interface 110. In this case, the GPS can be used interchangeably with GNSS.

The processor 180 of the portable apparatus 100 may detect a vehicle of the plurality of vehicles having the same number which has route information matching the route information of the user (S533) and determine the vehicle as the boarding vehicle (S534).

In detail, the communication interface 110 may receive route information of each of a plurality of vehicles having the same number from the vehicle information server 200. In this case, the route information may include information in which stop information of each vehicle is connected to successive nodes.

The processor 180 may obtain route information of a plurality of vehicles having the same number from the communication interface 110, and detect nodes close to the position information of the portable apparatus 100 of the obtained route information. The processor 180 generates user path information using the location information of the user, and a vehicle including a route connecting some nodes of the vehicle route information and route information corresponding to the user path information may be specified as a vehicle of a plurality of vehicles in which the user boards.

In another embodiment, if the user location information is maintained at the same location for a predetermined time, the processor 180 of the portable apparatus 100 can determine as a getting off stop of the boarding vehicle and determine the vehicle having the route information of each route information of the plurality of vehicles which matches the position determined as the getting off stop as the vehicle in which the user boards.

For example, suppose that a user boards a bus having a number of 840. The communication interface 110 of the portable apparatus 100 may communicate with the server 200 to receive route information on each of a plurality of buses to which 'number 840' is assigned. The processor 180 of the portable apparatus 100 may obtain user location information obtained from the GPS, and generate user path information using the user location information. The processor 180 may detect the bus having number 840 that is matched by comparing stop nodes included in the route information of each of the plurality of buses having number 840 with user path information. The processor 180 may determine the detected bus having number 840 of the plurality of buses having number 840 as the bus having a number of 840 in which the user is currently boarding.

When the vehicle boarded by the user is specified, the portable apparatus 100 according to the present disclosure may specify a stop to provide a getting off notification.

Figure 8:
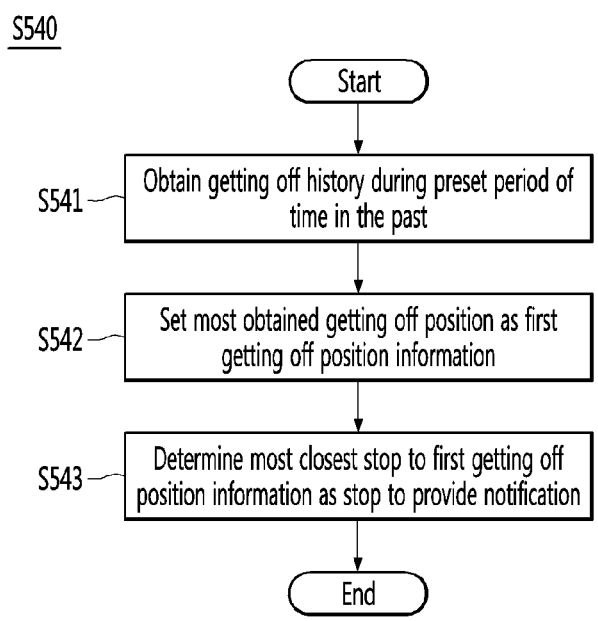
FIG. 8 is a flowchart of the present disclosure.

Hereinafter, a detailed description with reference to FIG. 8 is as follows.

FIG. 8 is a flowchart of the present disclosure.

Specifically, FIG. 8 is a flowchart for specifying a stop to provide notification.

If the processor 180 of the portable apparatus 100 of the present disclosure determines that the user boards a specific vehicle of a plurality of vehicles having the same vehicle information, the processor 180 may specify a stop to provide getting off notification.

In detail, the memory 170 of the portable apparatus 100 may store the getting off location information that the user got off the boarding vehicle in the past. The processor 180 may receive a getting off history in which the getting off location information of the past user is stored from the memory 170 and determine a stop to provide notification based on the getting off history.

In this case, the processor 180 may determine a stop closest to the getting off location information of the stops included in the route information of the boarding vehicle as the stop to provide notification.

In this case, the getting off location information may include location information of a user obtained from a satellite when the motion state data is changed from a vehicle boarding state to a non-boarding state. The non-boarding state may mean a walking motion state or a stationary motion state.

Figure 9:
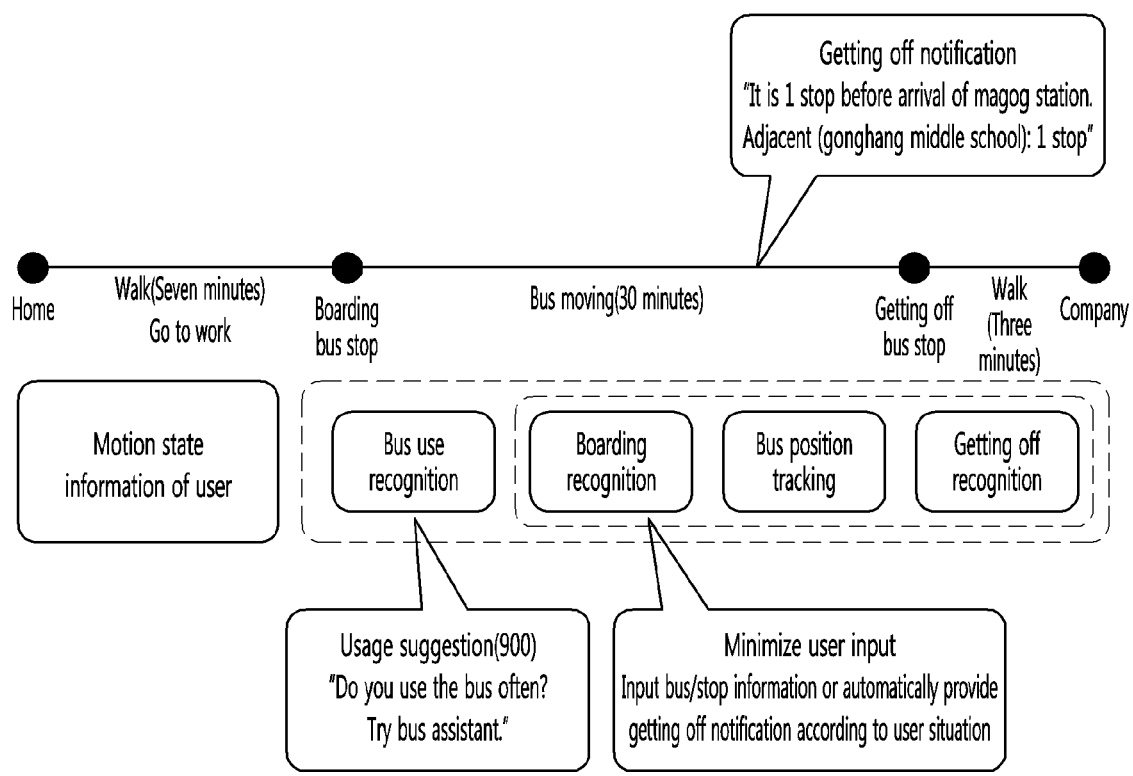
FIG. 9 is a scenario of the present disclosure.

In another embodiment, referring to FIG. 9, the memory 170 of the portable apparatus 100 may store getting off history information in which a plurality of getting off location information that the user got off the boarding vehicle is stored.

The processor 180 of the portable apparatus 100 may obtain the user's getting off history by using the getting off position information collected during the preset period from the memory 170 (S541).

The processor 180 may obtain first getting off location information, which is most obtained first getting off position information of a plurality of getting off location information included in the getting off history (S542).

In addition, the processor 180 may determine a stop closest to the first getting off location information of stops included in the determined route information of the vehicle as the stop to provide notification (S543).

In this case, the getting off location information may include location information of a user obtained from a satellite when the motion state data is changed from a vehicle boarding state to a non-boarding state. The non-boarding state may mean a walking motion state or a stationary motion state.

The processor 180 of the present disclosure may determine a stop closest to the most obtained first getting off location information of the plurality of getting off location information included in the getting off history as a 'stop to provide notification'. As a result, when a user who repeatedly uses a certain section boards a specific vehicle, the processor 180 can automatically determine a stop at which the user periodically gets off, and, when the vehicle in which the user boards reaches near a stop to provide getting off notification, the getting off notification can be provided to the user.

As another example, in a method for providing the getting off notification, when an application installed in the portable apparatus is used, when the application needs to obtain a specific authority for providing notification through the output interface 150, the processor 180 may suggest the use of the get off notification to a user. For example, in a case where an operating system of Android, data for the get off notification function in the low power domain may be accumulated, and if the user activates the get off notification function, the output process for the getting off notification in the high power domain may be performed.

In detail, the processor 180 according to the present disclosure may propose to the user to use the getting off notification service for the boarding vehicle when the getting off history information is collected at a predetermined level or more. The output interface 150 of the portable apparatus 100 may output push notification or the like to provide a notification to the user to use the getting off notification service.

If the user allows the getting off notification function, the input interface 120 of the portable apparatus 100 may receive the vehicle information and the stop information and provide the getting off notification. At this time, the processor 180 specifies the boarding vehicle of the user using the vehicle information obtained from the input interface 120, and if it is determined that the user boards the boarding vehicle, the stop information obtained from the input interface 120 can be specified the information as a stop to provide notification. The output interface 150 of the portable apparatus 100 may provide getting off notification when a preset distance is reached from the stop to provide notification.

In addition, if the user allows the getting off notification function, the portable apparatus 100 may provide getting off notification even without the user's boarding vehicle information and the stop information through the processes of FIGS. 5 to 8.

FIG. 9 is a scenario of the present disclosure.

In detail, referring to FIG. 9, suppose that a situation where the user repeatedly moves a certain section (for example, when commuting).

The user walks from home to the bus stop to board. In this case, the processor 180 of the portable apparatus 100 may obtain motion state data of the user through the motion classifier. The motion classifier may determine the motion state data of the user as the walking motion state. When the user approaches the bus stop and the bus to be boarded by the user approaches the boarding stop, the communication interface 110 of the portable apparatus 100 may communicate with the bus to obtain vehicle information of the bus to be boarded.

For example, if a user boards the bus having a number of 840, the processor 180 of the portable apparatus 100 may obtain vehicle information which is '840'. If the user boards the bus having a number of 840, in a case where the getting off notification function is not activated, the portable apparatus 100 may suggest the use of the bus getting off notification function. For example, the output interface 150 of the portable apparatus 100 may output in a manner which notification such as "Try a bus assistant" is output as a voice, push notification, or display.

If the getting off notification function is already activated, the portable apparatus 100 changes the motion state data of the user to the vehicle boarding state, and if the vehicle information obtained by the processor 180 is maintained at '840' during a predetermined time, it can determine that the user boards the bus having a number of 840.

The processor 180 of the portable apparatus 100 may receive user location information and determine a bus in which the user boards of a plurality of buses having a number of 840 using the route information of the bus having a number of 840 and the user path information.

Meanwhile, if the getting off notification function is provided through the application, the user may input a bus to be boarded and a stop to get off through the input interface 120 of the portable apparatus 100. The processor 180 of the portable apparatus 100 may use the information received through the input interface 120 to control the output interface 150 to output a getting off notification when the bus reaches a preset distance from the input getting off stop.

According to this scenario, if the processor 180 determines that the user reaches a preset distance from the stop to provide the getting off notification, the output interface 150 may provide the getting off notification. For example, voice notification, such as "It is 1 stop before the arrival of the Magog Station." can be output.

In addition, the processor 180 changes the user motion state data from the vehicle boarding state to the walking motion state or the stop motion state, and if the communication with the wireless network communicating with the communication interface 110 of the portable apparatus 100 is maintained in a state of being interrupted for a predetermined time or more, it is determined that the user got off the vehicle, the user location information when getting off can be stored in the memory 170.

In this case, the getting off history may be updated with the stored user location information.

Hereinafter, FIG. 10 will be described.

Figure 10:
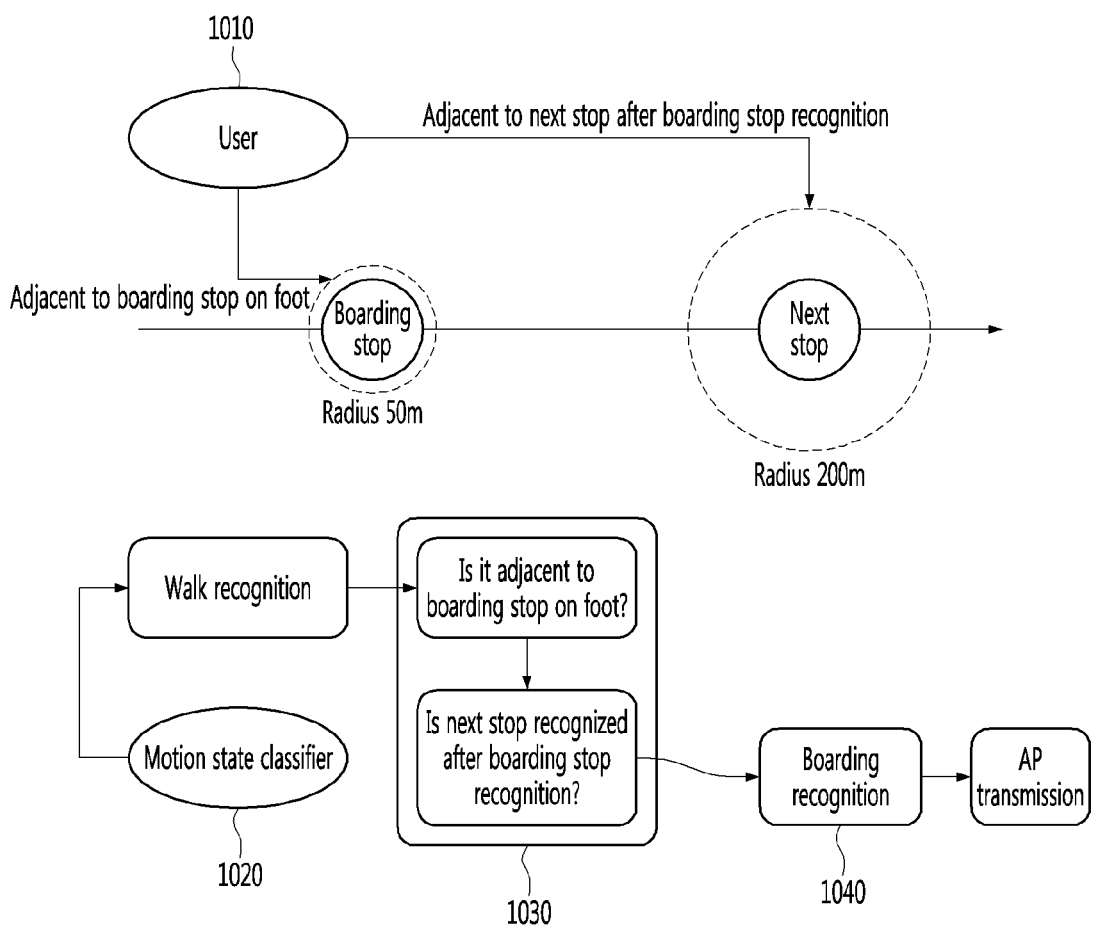
FIG. 10 is a scenario of the present disclosure.

FIG. 10 is a scenario of the present disclosure.

FIG. 10 is a vehicle boarding determination scenario if a user inputs a boarding vehicle and a getting off stop through the input interface 120. Descriptions duplicated with FIG. 9 will be omitted.

Referring to FIG. 10, a user 1010 may be adjacent to a boarding stop through walking. if the user is adjacently located within a radius of 50 meters from the boarding stop, the portable apparatus 100 may propose to use the getting off notification function.

The processor 180 of the portable apparatus 100 may obtain the walking motion state of the user obtained by the motion state classifier 1020 as the motion state data. If the boarding vehicle information and the getting off stop information are input to the input interface 120 of the portable apparatus 100, the processor 180 may obtain the boarding vehicle information and the getting off stop information from the input interface 120.

When the user boards the vehicle at the boarding stop, the processor 180 may obtain route information of the vehicle specified in the boarding vehicle information. In addition, if the user location information approaches the stop next to the boarding stop within a predetermined distance (for example, a radius of 200 meters) while the user motion information is the vehicle boarding state, the processor 180 can determine that the user boards the vehicle input by the user 1040.

Figure 11:
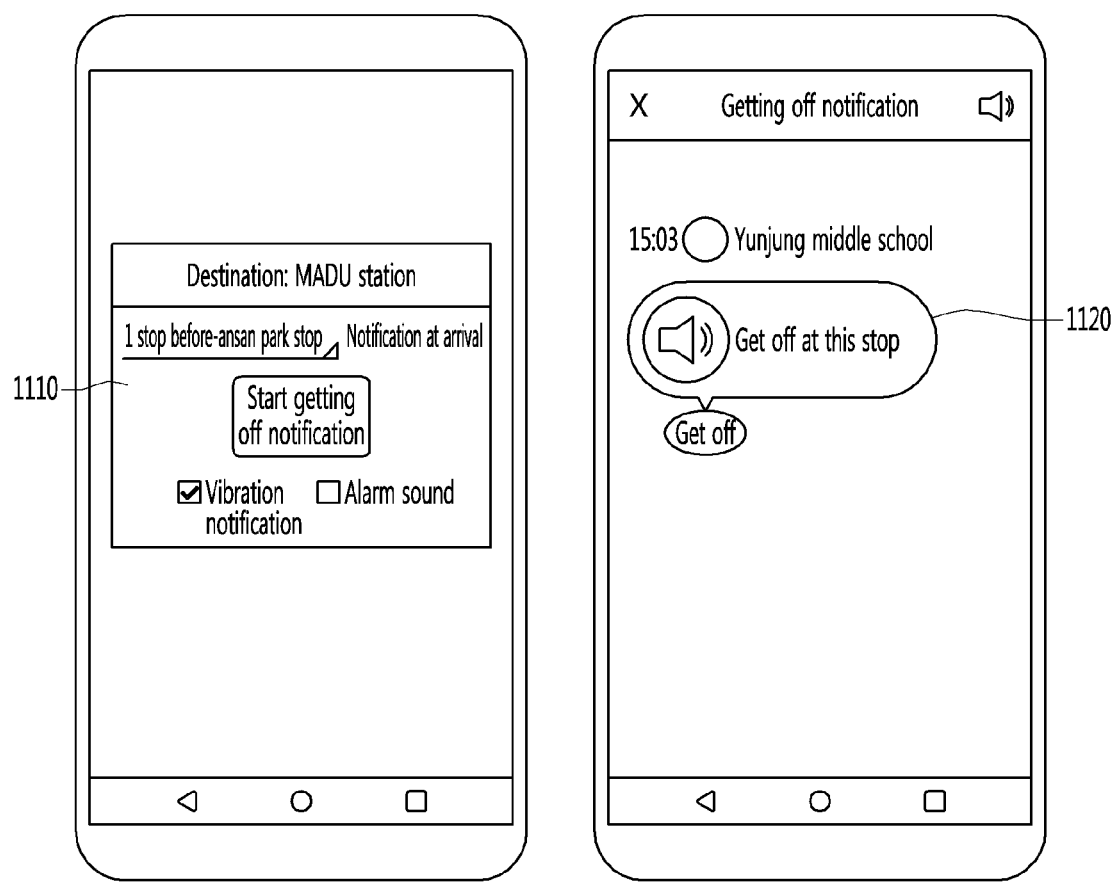
FIG. 11 is an example illustrating output of the present disclosure.

FIG. 11 is an output example of the present disclosure.

Referring to FIG. 11, the output interface 150 of the portable apparatus 100 may provide getting off notification when a preset distance is reached from a stop to provide notification. For example, when the user inputs vehicle information to be boarded and stop information into the portable apparatus, the output interface 150 may output a UI for user input as illustrated in 110.

Specifically, the stop (for example, MADU station) to get off and the kind of notification (for example, vibration or sound) may be set.

Meanwhile, if the processor 180 of the portable apparatus 100 determines that the user reaches within a preset distance from the stop to get off, the processor 180 may control the output interface 150 to output the getting off notification. For example, the output interface 150 may output notification such as "Get off at this stop!" 1120.

A method for operating a portable apparatus according to the present disclosure may include communicating with a vehicle through a wireless network, obtaining vehicle information as the wireless network is connected and determining whether the user boards the vehicle based on motion state data of the user and the vehicle information; determining a stop to provide notification based on whether the user boards the vehicle and a getting off history; and outputting getting off notification, and a detailed operation method thereof may correspond to the configuration described with reference to FIGS. 5 to 8.

The present disclosure provides convenience when a vehicle is used by obtaining getting off stop information of a frequently used vehicle and providing notification before the stop to get off is reached when the user boards the vehicle.

Flowcharts according to the present disclosure may be performed regardless of the order or concurrently. That is, they are not constrained in time-series order.

Other implementations are within the scope of the following claims

The present disclosure can be made in software, firmware or a combination of software and firmware.

The present disclosure may include one or more processors. The one or more processors may include 'the processor 180' or 'a processor for operating an artificial intelligence model'.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An apparatus comprising:
a communication interface configured to communicate with vehicles via a wireless network;
a processor configured to:
obtain vehicle information via the communication interface, wherein the obtained vehicle information comprises a boarding vehicle number obtained from the wireless network,
determine whether a user boards a vehicle based on motion state data of the user and the obtained vehicle information,
determine a vehicle stop for providing a stop notification based at least in part on stop location information and a determination that the user boards the vehicle, and
determine whether the user boards the vehicle having the boarding vehicle number based on the obtained vehicle information, wherein the user is determined to board the vehicle having the boarding vehicle number when a connection time of the wireless network satisfies a predetermined time period and when the motion state data indicates a vehicle boarding state; and
an output interface configured to output the stop notification.

2. The apparatus of claim 1,
wherein the vehicle information is obtained based on a name of the wireless network that is connected.

3. The apparatus of claim 1,
wherein the processor is further configured to:
obtain route information for a plurality of vehicles each having the boarding vehicle number using the obtained vehicle information; and
identify a specific vehicle from the plurality of vehicles as the vehicle that the user has boarded by matching route information of the user with a vehicle having corresponding obtained route information.

4. The apparatus of claim 3, further comprising:

a memory configured to store the stop location information corresponding to vehicle stops where the user has previously exited a previously boarded vehicle, wherein the vehicle stop is determined based on determining a closest vehicle stop to the stop location information included in the route information of the boarding vehicle.

5. The apparatus of claim 3, further comprising:

a memory configured to store a plurality of stop location information corresponding to where the user has previously exited a previously boarded vehicle during a past time period, wherein the processor is further configured to:

obtain a first stop location information, wherein the first stop location information has a highest stop frequency among the plurality of stop location information, and wherein determining the vehicle stop to provide a stop notification further includes determining a closest vehicle stop to the first stop location information with respect to the vehicle stops included in the obtained route information of the vehicle.

6. The apparatus of claim 4, wherein the stop location information includes location information of the user when the motion state data indicates a change from a vehicle boarding state to a non-boarding state.

7. The apparatus of claim 1, further comprising:

an input interface configured to obtain the vehicle information and a stop information, wherein the processor is configured to:

identify a specific boarding vehicle from a plurality as vehicles as the vehicle that the user has boarded using the obtained vehicle information from the input interface; and identify a specific stop as the vehicle stop for providing the stop notification using the obtained stop information from the input interface;

wherein the stop notification is outputted when a preset distance is reached from the vehicle stop.

8. A method for operating an apparatus comprising:

communicating with vehicles via a wireless network;

obtaining vehicle information via a communication interface, wherein the obtained vehicle information comprises a boarding vehicle number obtained from the wireless network;

determining whether a user boards a vehicle based on motion state data of the user and the obtained vehicle information;

determining a vehicle stop for providing a stop notification based at least in part on a stop location information and a determination that the user boards the vehicle;

determining whether the user boards the vehicle having the boarding vehicle number based on the obtained vehicle information, wherein the user is determined to board the vehicle having the boarding vehicle number when a connection time of the wireless network satisfies a predetermined time period and when the motion state data indicates a vehicle boarding state; and outputting the stop notification.

9. The method for operating the apparatus of claim 8, wherein the vehicle information is obtained based on a name of the wireless network that is connected.

10. The method for operating the apparatus of claim 8, further comprising:

obtaining route information for a plurality of vehicles each having the boarding vehicle number using the obtained vehicle information; and identifying a specific vehicle from the plurality of vehicles as the vehicle that the user has boarded by matching route information of the user with a vehicle having corresponding obtained route information.

11. The method for operating the apparatus of claim 10, further comprising:

obtaining the stop location information corresponding to vehicle stops where the user has previously exited a previously boarded vehicle, wherein the vehicle stop is determined based on determining a closest vehicle stop to the stop location information included in the route information of the boarding vehicle.

12. The method for operating the apparatus of claim 10, further comprising:

obtaining a plurality of stop location information corresponding to where the user has previously exited a previously boarded vehicle during a past time period, and obtaining a first stop location information, wherein the first stop location information has a highest stop frequency among the plurality of stop location information, and wherein determining the vehicle stop to provide a stop notification further includes determining a closest vehicle stop to the first stop location information with respect to the vehicle stops included in the obtained route information of the vehicle.

13. The method for operating the apparatus of claim 11, wherein the stop location information includes location information of the user when the motion state data indicates a change from the vehicle boarding state to a non-boarding state.

14. The method for operating the apparatus of claim 8, further comprising:

obtaining the vehicle information and a stop information;

identifying a specific boarding vehicle from a plurality as vehicles as the vehicle that the user has boarded using the obtained vehicle information; and identifying a specific stop as the vehicle stop for providing the stop notification using the obtained stop information;

wherein the stop notification is outputted when a preset distance is reached from the vehicle stop.

\* \* \* \* \*